No. 614,557. Patented Nov. 22, 1898.
C. KILLING.
GAS LIGHTING DEVICE.
(Application filed Nov. 26, 1897.)
(No Model.)
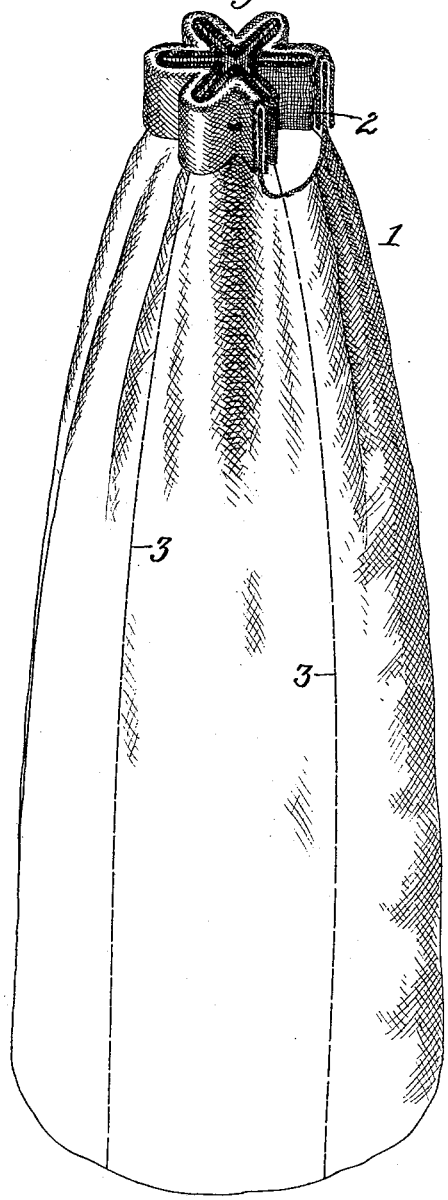
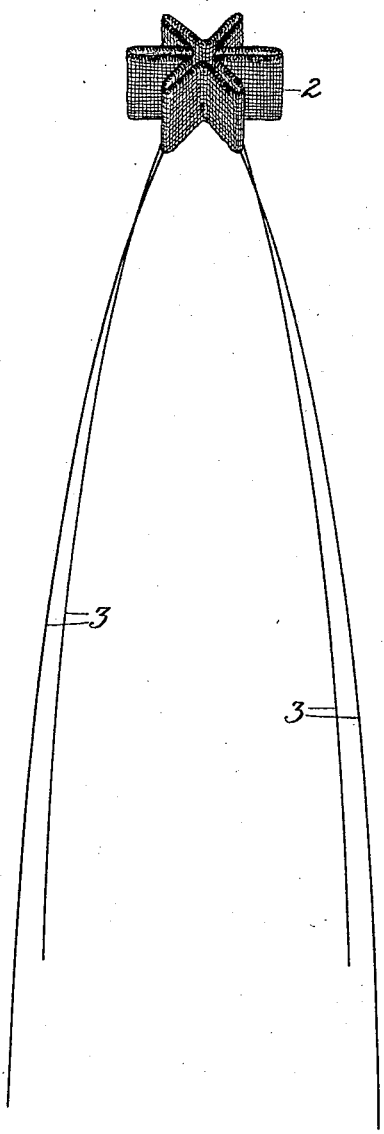
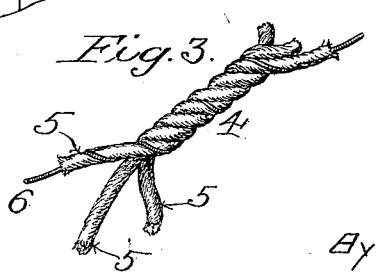

UNITED STATES PATENT OFFICE.

CARL KILLING, OF DUSSELDORF, GERMANY, ASSIGNOR, BY MESNE ASSIGNMENTS, TO THE UNITED STATES NOMATCH LIGHT COMPANY, OF WEST VIRGINIA.

GAS-LIGHTING DEVICE.

SPECIFICATION forming part of Letters Patent No. 614,557, dated November 22, 1898.

Application filed November 26, 1897. Serial No. 659,876. (No model.)

*To all whom it may concern:*

Be it known that I, CARL KILLING, a subject of the Emperor of Germany, residing at Dusseldorf, in the Empire of Germany, have invented certain new and useful Improvements in Gas-Lighting Devices, of which the following is a specification.

My invention pertains to self-igniting devices for gas-lights; and it consists in a novel composition of matter, in the method of preparing the same, and in the lighting device or attachment embodying the same.

In the accompanying drawings, Figure 1 is a perspective view of a mantle embodying my invention, the upper portion of the mantle being broken away to show the basket or body which holds the igniting material or preparation; Fig. 2, a view of the basket or body alone, and Fig. 3 a greatly-magnified view of a thread such as is used in the production of said basket or body.

It has long been known that certain bodies, notably spongy platinum, platinum and iridium black, and the like, have a great avidity for oxygen, hydrogen, and other gases, which are caused by virtue of this property to condense upon the surface of such substances. The property mentioned is possessed in its highest degree by metals of the platinum group. Many attempts have been made by scientists and others to make use of this peculiar property for the ignition of illuminating-gases, and the desired result has occasionally been attained and repeated a limited number of times with preparations embodying such substances or some of them; but so far as I am aware no one has thus far succeeded in producing a self-lighting device or attachment capable of prompt action and of prolonged life or usefulness. In other words, while various attempts have proven measurably successful for a few trials no one has, so far as I am advised, produced a self-igniting device capable of general or commercial use and of retaining its self-igniting property for a considerable length of time.

After very numerous and careful experiments, continuing over a long period of time, I have succeeded in producing a self-igniting device designed and adapted more particularly for use in combination with incandescent mantles, though not restricted to such use, which device is found to continue highly serviceable through a long period of time and under actual working conditions. To produce such igniter, I employ, preferably, a composition of thorium oxid and a metal of the platinum group in a state of very fine division, preferably in the form of platinum-black. In producing this compound I mix together in suitable proportions nitrate of thorium and chlorid of platinum, afterward ashing or burning out the mixture, and thereby producing a fixed sponge or body of thorium oxid and platinum-black. The proportions which I have found best suited to the end in view are one part of thorium nitrate to two to two and one-half parts of platinum-black, this mixture giving a fixed residue or body and possessing a very great affinity or showing an avidity for oxygen.

Iridium and other metals of the platinum group may be substituted for platinum or mixed therewith in slightly-varying proportions without departing from the spirit of my invention and without destroying the efficiency of the compound, though taking into consideration the various matters which go to determine a selection—efficiency, cost, facility of preparation, &c.—I regard platinum-black or platinum chlorid, which deposits platinum-black, as most suitable. So, too, other rare earths may be substituted for the thorium—as, for instance, cerium, zirconium, and the like; but thorium is deemed best.

A great difficulty hitherto experienced in the practical application and use of self-igniting preparations has been the retention of the material or compound in its required position, and an important feature of my invention is the means by which I attain this desired end. This I accomplish by first forming a thread of a number of cotton filaments, usually four to six, and a thin platinum wire (one or more) twisted or spun together and producing a composite thread, which thread is woven or knitted into a sheet or web, from which are cut or formed disks, baskets, or other forms, which are subsequently treated with the solution or preparation above described.

In order that the invention may be more exactly understood and practiced, I will describe the manner of applying the mixture to the prepared disk or other body and of combining the latter with a mantle, such as is commonly employed in incandescent lighting.

The composite thread having been woven into a sheet, web, or fabric and cut to the required form or woven in the first instance to the desired form is immersed in a five-per-cent. solution of caustic soda in a boiling state, where it is left for about ten minutes. It is next taken from the solution and thoroughly washed in clear water for the purpose of removing all traces of the soda and is then thrown into a boiling five-per-cent. solution of muriatic acid, where it is allowed to remain for ten minutes. The material is next thoroughly washed in clear water to remove all traces of the acid and is then dried either in the sun or in a suitable drying-room. When thoroughly dry, the woven material is immersed in the solution of nitrate of thorium and chlorid of platinum or chlorid of iridium, whereby its pores and interstices become filled with the solution. It is then dried and thereafter subjected to heat sufficient to carbonize the threads and to convert the deposit left by the solution into a spongy or porous body of thorium oxid and platinum or iridium black.

Owing to the net-like form of the body and to the open or porous condition of its threads and of the deposit in the threads, a great amount of surface is exposed to the gas or gas and air brought into contact with the lighter in use, and the platinum-black is consequently exposed in the most efficacious manner to the gas and air and accordingly develops with great rapidity the heat necessary to render it incandescent and capable of lighting the gas.

The lighting device or attachment so produced may be applied in any convenient or suitable way to the gas-burner or mantle with which it is to be used; but in the case of a mantle it is desirable that the prepared body be placed at or near the top of the mantle, where it may receive a sufficient supply of oxygen; but it is likewise desirable that means be provided for carrying the heat and incandescence down to a point near the gas-tip for the purpose of igniting the gas in close proximity thereto. With this object in view I carry from the upper end or head of the mantle downward to or near its lower end a series of threads, usually about four in number, composed of cotton filaments and fine iridium wire similar to that used in the production of the disk or basket at the top and impregnated with the solution of thorium and iridium or thorium and platinum in substantially the proportions before stated. These threads are stitched in place and are afterward connected with or carried to the lighting disk or body, which is likewise stitched with asbestos thread or wire into the top of the mantle. It is, however, desirable that the stitching be somewhat loose and the opening at the head of the mantle be left reasonably wide for the purpose of affording a sufficiently large space about the lighting device or between it and the head of the mantle. Other modes of attachment may obviously be employed.

Referring again to the drawings, 1 indicates a mantle such as now commonly used with incandescent gas-burners, 2 the woven or knitted body of the lighter, which contains and supports the lighting preparation, and 3 the composite threads, extending from the disk or lighter downward toward the foot of the mantle.

In Fig. 3 the composite thread 4 is shown to consist of a series of filaments 5, of cotton or other vegetable material preferably, (though other filaments may be employed,) and a fine iridium wire 6, spun or twisted together, so as to make the compound thread described.

A mantle constructed in accordance with the above description has been in constant use for months and lighted frequently and has never failed to light promptly through the unassisted action of the self-lighting device.

The lighting attachment hereinbefore set forth may be applied to woven or knitted mantles of the class mentioned or may be used in connection with ordinary gas-burners, though more particularly intended for the former. The mode of attachment or of support may vary according to circumstances; but that described is preferred for mantles.

The proportions of the rare earth and the metal may vary within reasonable limits; but those stated are deemed best and are given as the result of a great number of practical tests.

I am aware that it has been proposed to construct incandescing mantles or bodies of a thread consisting of a core of metal or of asbestos with filaments of vegetable substances braided about such core. My thread is to be distinguished from such in that the wire is spun with the rovings, and consequently wrapped about them in such manner as to hold within its coils the ashed remains of the fibers impregnated with the lighting material when the lighter is ashed or burned out. So far as I am aware no one has hitherto formed a basket, body, or holder of a fabric woven or knitted of thread having a wire filament spun with vegetable filaments; nor, in fact, has a lighting attachment ever been made of a fabric containing threads composed in part of wire, whether spun with or constituting the core of such thread. Owing to the tendency of the lighting preparation to be jarred or shaken from ordinary forms of holder and to the lack of strength of ashed threads unprovided with the wire, the employment of such wired fabric, and particularly when the wire is spun with the other filaments of the thread, so as to encompass and hold them, becomes a matter of signal importance. While, therefore, my invention is not restricted to the use of the wire or wired fabric, I deem a lighter formed of such fabric and properly impregnated with the lighting substance to be readily distinguishable from and an improvement over other forms of lighter.

Having thus described my invention, what I claim is—

1. A self-lighting attachment for burners, consisting of a basket or body formed of a thread spun from vegetable and metal filaments, the metal being of the platinum group, said basket or body being impregnated with a mixture of rare earth such as thorium, and a metal of the platinum group, in a state of high division, substantially as set forth.

2. The herein-described composition for self-lighting attachments to burners, consisting of an oxid of a rare earth, such as thorium, and metal of the platinum group in a state of high division, said earth and metal being combined in substantially the proportions stated.

3. A self-lighting attachment comprising a supporting body or skeleton woven or knitted of thread composed of vegetable filaments and a wire or wires of metal of the platinum group, spun or twisted together, said body or skeleton being impregnated with the lighting material, substantially as described.

In witness whereof I hereunto set my hand in the presence of two witnesses.

CARL KILLING.

Witnesses:
WM. ESSENWEIN,
ERNEST ANDRÉ.